United States Patent [19]

Spindler

[11] 4,156,223
[45] May 22, 1979

[54] POSITIONAL TRANSDUCER UTILIZING MAGNETIC ELEMENTS

[75] Inventor: John D. Spindler, Wildwood, Ill.

[73] Assignee: Illinois Tool Works Inc., Chicago, Ill.

[21] Appl. No.: 898,584

[22] Filed: Apr. 21, 1978

[51] Int. Cl.² .................... H01F 21/06; G08C 19/06
[52] U.S. Cl. .................................. 336/110; 336/132; 340/197; 365/62; 365/137
[58] Field of Search ................ 365/62, 137; 340/197, 340/196, 195; 336/110, 132, 130

[56] References Cited

U.S. PATENT DOCUMENTS

| 3,958,202 | 5/1976 | Sidor | 336/110 |
| 4,045,787 | 8/1977 | Sidor et al. | 336/110 X |

*Primary Examiner*—Thomas J. Kozma
*Attorney, Agent, or Firm*—Glenn W. Bowen; Robert W. Beart

[57] ABSTRACT

An improved positional transducer is disclosed which utilizes an elongated, hollow, cylindrical tube of a magnetically saturable material, a sense wire that runs through the tube parallel to its elongated axis and a pair of elongated, generally rectangular shaped magnets of opposite polarity which are closely positioned adjacent diametrically opposite exterior portions of the tube. As the magnets move over in the tube, they provide substantially complete saturation of the tube in the portion over which they extend while the remaining portion of the tube remains unsaturated thereby giving a linear indication of the position of the magnets with respect to the tube. In the improved version, shown herein, adjustments of the electrical slope (volts/inches of travel) are achieved by a slot cut through the wall of the tube in the direction of the tube's length.

2 Claims, 5 Drawing Figures

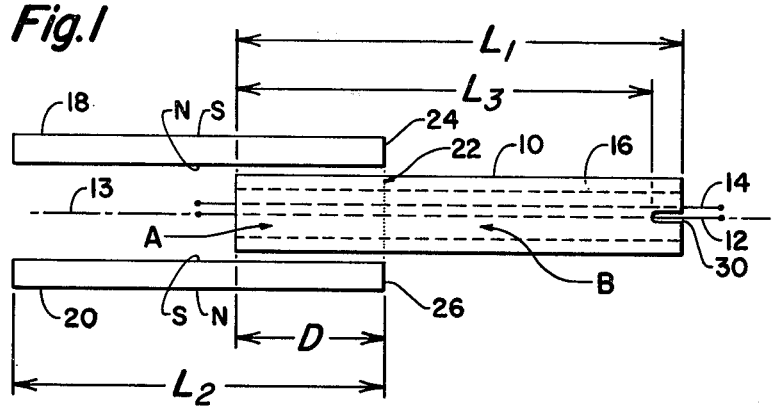
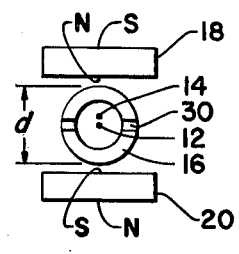
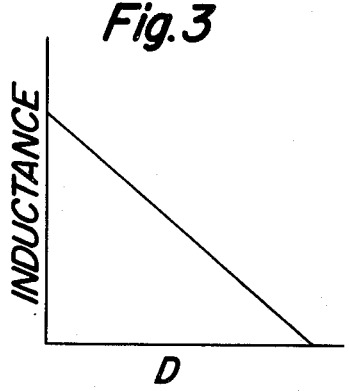
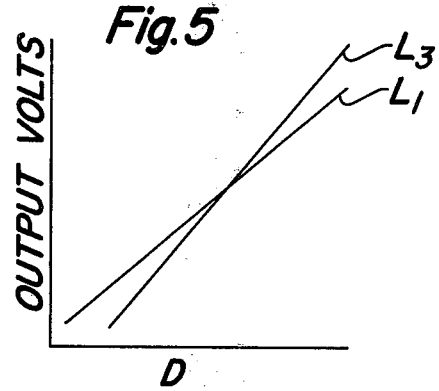
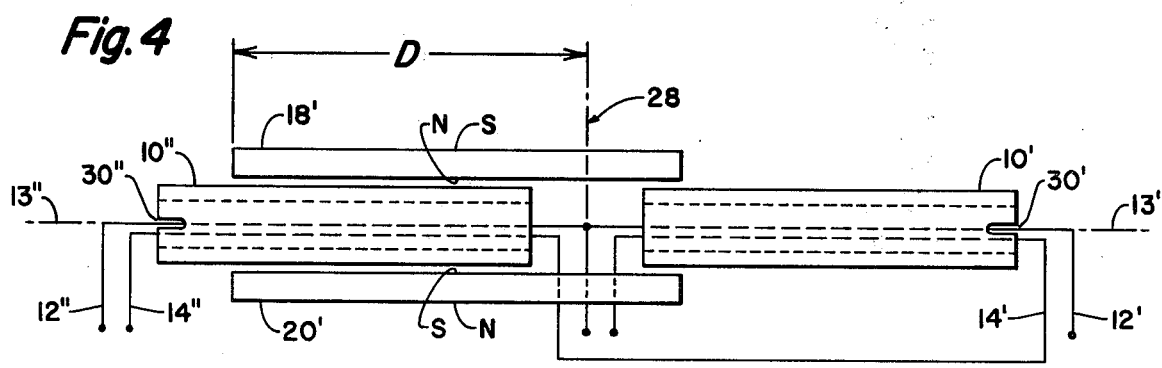

4,156,223

POSITIONAL TRANSDUCER UTILIZING MAGNETIC ELEMENTS

BACKGROUND OF THE INVENTION

The present invention relates to an improved positional sensing transducer of the type shown in U.S. Pat. No. 3,958,203, issued May 18, 1976 in the name of Victor M. Bernin and assigned to the assignee of the present invention. The transducer utilizes an elongated tube constructed of a magnetically saturable material. A sense wire runs through the tube and a pair of oppositely poled magnets are positioned on diametrically opposite exterior portions of the tube so that the magnetic flux from the magnets will completely saturate the portion of the tube that lies between the magnets, while the remaining portion of the tube remains unsaturated.

The Bernin patent uses a hollow, elongated cylindrical tube constructed of a material which is magnetically saturable, a sense wire that runs through the tube, and two oppositely poled magnets that move along the outside of the tube in order to provide an accurate linear indication of the position of the magnets with respect to the tube on the sense line. In other words, the present invention does not provide a "1" or a "0" output signal, but instead it may be used to accurately determine the position of the saturating magnets with respect to the tube. The portion of the elongated tube that lies between the magnets is saturated while the remaining portion is not. Because the tube provides a closed flux path, there is no substantial fringing affect at the ends of the saturating magnets; and, therefore, the portion of the tube that is not between the magnets remains substantially unsaturated. Since the output signal that is provided on the sense wire through the tube is not dependent upon the magnetic characteristics of the tube, but merely upon the position of the magnets with respect to the tube, a very linear output signal is achieved. In addition, problems that affect magnetic sensors that depend on partial saturation of the sensing element, such as temperature variation and aging variation, are also eliminated. Moreover, magnetic force that is required to operate the device of the present invention is not critical because of reliance on saturation of the tube between the magnets to produce the output signal.

DESCRIPTION OF THE DRAWINGS

The present invention is illustrated by reference to the drawings in which:

FIG. 1 is a side view of a single tube embodiment of the present invention;

FIG. 2 is an end view of the embodiment of the transducer of FIG. 1;

FIG. 3 is a graph showing the relationship between the position of the saturating magnets and the inductance of the device operated as an inductance element and constructed in accordance with FIG. 1;

FIG. 4 shows an embodiment of the present invention in which two tubes are connected together to form a differential potentiometer;

FIG. 5 is a graph showing the electrical slope of the tube of FIG. 1 with respect to the displacement of the saturating magnets with and without slope adjustment.

TECHNICAL DESCRIPTION OF THE INVENTION

Positional transducers are shown in the previously mentioned Bernin patent which are highly linear, contactless, very accurate and reliable, capable of functioning in severe environments and are relatively low in cost. The manner in which the linear transducer of this patent is constructed is shown in FIG. 1 in which the elongated hollow tube 10 may be constructed of a ferrite or other suitable material which is capable of being magnetically saturated. If an inductive version of the transducer is desired, a single sense wire 12 may pass through the tube parallel to the elongated axis of the tube. Alternately, a drive wire 14 could also be inserted into the tube 10 and could be supplied with an electrical current pulse in order to provide transformer action between the drive wire 14 and the sense wire 12. By use of the cylindrical hollow tube 10, a closed magnetic flux path is provided around the sense wire 12 through the walls 16 of the tube 10.

The actual length of the tube 10 is dependent upon the type and the accuracy of sensing that is desired. In general, however, the elongated dimension $L_1$ of the tube will be on the order of at least ten times the thickness of conventional toroidal cores that are commercially available for magnet memory core applications; and the elongated dimension $L_1$ of the tube 10 will generally be over one inch if relatively accurate sensing is required. The elongated dimension $L_2$ of the magnets 18, 20 is approximately the same length as the length $L_1$. The longer the tube, the more highly accurate the sensing device becomes. The relative position of a pair of magnets 18, 20 which are oppositely poled and which are adjacent the exterior of the periphery of the walls 16 determines the output signal that appears in the sense wire 12. As the magnets 18, 20 travel from the left and the right, as viewed in FIG. 1, they will substantially saturate a greater and greater volume of the tube 10. In the position shown in FIG. 1, the portion A of the tube 10 between the magnets 18, 20 will be substantially saturated; while the portion B outside of the magnets 18, 20 will be substantially unsaturated. Although there will be some degree of saturation in the vicinity of the boundary line 22 between portions A and B, this will be very small because of the close proximity of the magnets 18, 20 to each other and because of the closed magnetic flux path provided by the walls 16.

As the magnets 18, 20 move to the left or the right over the tube, a respective different amount of the volume of the tube is magnetically saturated so as to give an indication of the sense line of the relative position of the tube 10 with respect to the magnets 18, 20. Since each portion of the tube is either completely saturated or is substantially unsaturated, the device is virtually free from temperature and aging affects and it does not require a critical magnetic force, as would be the case if the entire structure of the tube 10 were partially magnetically saturated by the magnets 18, 20. Thus, the tube 10 can be saturated incrementally with a high degree of magnetic resolution and control. To achieve this result, there must be a high ratio of the length $L_1$ of the tube 10 to its diameter d so that the small air gap between the magnets 18, 20 and the wall 16 results in a more confined and controllable flux configuration so that the transducer is not flux density sensitive.

The tube 10 may be extruded resulting in a high uniformity of cross-sectional area which contributes to transducer accuracy. Also, since inductive windings are not wound about the tube 10, the magnets 18, 20 may be placed close to the wall 16 and a small wall thickness of the wall 16 contributes to high magnetic resolution also. The graph of FIG. 3 shows that as the distance D from the lefthand side of the tube to the righthand sides 24, 26 of the magnets 18, 20, respectively, increases, the inductance of the tube 10 decreases in a substantially linear manner in accordance with the relative position of the magnets 18, 20 and the tube 10.

As noted above, the transducer of the present invention may alternately be implemented as a transformer element by the addition of a drive line 14 in the embodiment of FIG. 1 to the inductive embodiment which utilizes only the sense line 12. In addition, the present invention may be connected in a combination with other elements or with additional transducers. For example, the embodiment of FIG. 4 shows a configuration in which a first magnetic tube 10' is positioned near a second magnetic tube 10" so that the axis of the elongated dimensions of the tubes are aligned. The sense wires 12' through the tube 10' and the sense wire 12" through the tube 10" are connected together at their midpoints to form a three-terminal output device which is utilizable as a differential potentiometer. As the magnets 18', 20' move over the tubes 10', 10", various portions of the respective tubes become saturated and unsaturated. FIG. 5 shows the relationship of the distance D' from the centerline C midway between the lefthand end of the tube 10' and the righthand end of the tube 10" to the lefthand end of the magnets 18', 20' as they move to the right, as viewed in FIG. 4, with respect to the ratio of the inductance of the tube 10" to the inductance of the tube 10" for an inductor embodiment. A similar linear inductance ratio is obtained as the magnets move to the right. Like the embodiment of FIG. 1, the device may be converted to a transformer type device merely by the addition of the drive lines 14', 14" which are not used in the inductor version. The embodiment of FIG. 4 can also be modified by adding drive wires 14', 14" to form a differential transformer configuration. In this case, the righthand sides of the leads 14', 14" are connected together to form the output windings of the potentiometer while the leads 12', 12" again from the sense windings.

When only the sense wire is employed in the device of FIG. 1; and if it is used as an inductor sensing element, an AC excitation signal is normally used. Excitation is generally from a current source so that the voltage across the inductive transducer will be directly proportional to the variation of inductance caused by the relative position of the magnets 18', 20' and the tubes 10', 10". The inductor may be coupled to an oscillator circuit for sensing in a conventional manner.

If a three-terminal potentiometer transducer is desired, as shown in FIG. 4, a constant voltage excitation may be impressed across the sense lines 12', 12". If the drive lines 14', 14" are added to the embodiment of FIG. 4 to form a transformer type transducer, they are connected in phase opposition so that when the magnets 18', 20' are positioned so that the centerline 28 bisects their length dimension $L_2$, a null output signal will result. As the magnets move in one direction or the other, the output signal varies from its null position and undergoes a phase reversal as the center of the magnets pass over the centerline 28.

The electrical slope (volts/inches of travel) of the linear transducer of the Bernin patent, however, is fixed by the length of the ferrite tubes used to make the device. This slope is also dependent on the production tolerances and the dimensions of the tubes and the magnets. Therefore, if the length tolerance is on the high side, the slope will be lower than desired; and if on the low side, the slope will be higher than desired for high accuracy applications. This slope was previously adjusted through gain and offset adjustments of the support electronics. This adjustment procedure has the disadvantage that the transducer and electronics must stay together as a set and are not directly interchangeable with other units.

The described adjustment of the slope of the type of transducer of the present invention is achieved in a manner which overcomes the problems associated with adjustment procedure of the prior art which thereby makes this type of transducer more attractive commercially.

In the improved transducer of the present invention, manufacturing tolerances are taken into account so that the length tolerance of the tubes will be on the high side, and the slope will be lower than a desired value when a transducer is produced. For example, reference to FIG. 5 shows a line labelled $L_1$, which corresponds to the Length $L_1$ in FIG. 1, and which represents the initial electrical slope of the device in terms of output volts per inches of travel of the magnets 18, 20 before slotting. Manufacturing tolerances are controlled so that the slope of the Line $L_1$ of FIG. 5 will always be lower than the desired slope which is indicated by the Line $L_3$ in FIG. 5. The Line $L_3$ in FIG. 5 corresponds to the shorter effective Length $L_3$ of FIG. 1 after the slot 30 has been cut into the end of the tube 10 in the direction of the axis 13. The slot 30 has a length sufficient to reduce the effective length of the device from Length $L_1$ to Length $L_3$ (FIG. 1) so as to thereby obtain the desired change of electrical slope from Line $L_1$ to Line $L_3$, as shown in FIG. 5. In a similar manner, the tubes 10' and 10" of FIG. 4 may have their lengths electrically adjusted to desired values, so as to balance the device of FIG. 4 accurately, by means of the slots 30' and 30" that are respectively cut into the ends of the tubes 10' and 10" along the axes 13' and 13".

The improved transducer of the present invention is commercially advantageous over the transducer of the prior invention Bernin patent in that the electrical slope can be adjusted after the tubes have been wound and assembled together in their housings; and moreover, adjustment can be made independently of the support electronics. In some applications, for example, automotive applications, where the interchangeability of the transducer and the support electronics is of great importance, the significance of this advantage will be more fully appreciated. The manner in which the slots are cut into the tubes is not important and various types of standard cutting equipment including lasers, diamond cutters, and abrasive machines may be employed to form the described slots. In addition, although two slots are shown cut into the ends of the magnetic tubes of the illustrated transducers, a transducer may be constructed within the scope of the present invention by cutting a single slot into an end of a magnetic tube of a transducer.

The invention is claimed as follows:

1. In a sensing device comprising a cylindrical, elongated, hollow tube having an elongated axis and constructed of material which is magnetically saturable, at least one sense wire that passes through said tube in a direction substantially parallel to the elongated axis of said tube and a pair of opposite magnetic poles diametrically opposed adjacent the outer periphery of said tube which completely magnetically saturate the portion of said tube which is disposed intermediate said magnetic poles but which are substantially ineffective in magnetically saturating the remaining portion of said tube, the improvement comprising said sensing device constructed so that all tolerances provide an initial electrical slope value which is lower than a desired slope value and a slot cut into an end of said tube in the direction of said elongated axis of said tube having the length required to increase said electrical slope value of said sensing device to said desired slope value.

2. A sensing device comprising an elongated, hollow tube having an elongated axis and constructed of a material which is magnetically saturable, at least one sense wire that passes through said tube in a direction substantially parallel to the elongated axis of said tube and elongated permanent magnet means constructed to completely magnetically saturate a portion of said tube which is disposed adjacent said magnet means and to be substantially ineffective in magnetically saturating the remaining portion of said tube so that the total volume of said tube which is completely magnetically saturated varies in a controlled manner in accordance with the position of said magnet means relative to said tube, the improvement comprising said sensing device constructed so that all tolerances provide an initial electrical slope value which is lower than a desired slope value and a slot cut into an end of said tube in the direction of said tubes elongated axis of said tube having the length required to increase said electrical slope value of said sensing device to said desired slope value.

* * * * *

UNITED STATES PATENT AND TRADEMARK OFFICE
CERTIFICATE OF CORRECTION

PATENT NO. : 4,156,223
DATED : May 22, 1979
INVENTOR(S) : John D. Spindler

It is certified that error appears in the above-identified patent and that said Letters Patent are hereby corrected as shown below:

Column 1, line 55, cancel "embodiment".

Column 1, line 56, cancel "of the embodiment".

Column 1, line 56, cancel "transducer" and substitute -- tube --.

Column 1, line 67, add "sensor" after "tube"

Column 1, line 67, cancel "1" and substitute -- 4 --.

Column 2, line 52, change "of" first occurrence to -- on --

Column 3, line 29, change "D'" to -- D --.

Column 3, line 29, change "C" to -- 28 --.

Column 3, line 33, cancel "inductance" and substitute -- sum of the inductances --.

Column 3, line 34, cancel "tube" and substitute -- tubes --

Column 3, line 34, add "and 10'" after "10".

Column 3, line 36, cancel "right" and substitute -- left --

Column 3, line 52, cancel "18'" and substitute -- 18 --.

Column 3, line 52, cancel "20'" and substitute -- 20 --.

UNITED STATES PATENT AND TRADEMARK OFFICE
CERTIFICATE OF CORRECTION

PATENT NO. : 4,156,223
DATED : May 22, 1979
INVENTOR(S) : John D. Spindler

It is certified that error appears in the above-identified patent and that said Letters Patent are hereby corrected as shown below:

Column 3, line 53, cancel "tubes 10', 10" " and substitute -- tube 10 --.

Column 4, line 38, cancel "a smiler " and substitute -- this --.

Signed and Sealed this

Ninth Day of October 1979

[SEAL]

Attest:

RUTH C. MASON
Attesting Officer

LUTRELLE F. PARKER
Acting Commissioner of Patents and Trademarks